113,055

UNITED STATES PATENT OFFICE.

ISAIAH SMITH HYATT, JOHN WESLEY HYATT, JR., AND JESSE A. PERKINS, OF ALBANY, NEW YORK, ASSIGNORS TO "ALBANY DENTAL-PLATE COMPANY," OF SAME PLACE.

IMPROVEMENT IN DENTAL PLATES FROM PYROXYLINE.

Specification forming part of Letters Patent No. 113,055, dated March 28, 1871.

We, ISAIAH SMITH HYATT, JOHN WESLEY HYATT, Jr., and JESSE A. PERKINS, M. D. S., of the city and county of Albany and State of New York, have invented a new Manufacture of Dental Plates, of which the following is a specification:

In the manufacture of dental plates or bases for artificial teeth, vulcanite or hard rubber, which has been extensively employed for the purpose, has been found objectionable on account of its dark color, offensive taste, and smell, at times, liability to break when chilled, and difficulty of repairing the plates when broken; the large amount of mercury contained in the coloring material (vermillion) employed, which renders it particularly obnoxious to some persons; the length of time required to manufacture the plates; and the qualities which render it unpleasant for dentists to manipulate.

To obviate these objections various experiments and attempts have been made to substitute for such plates compounds of pyroxyline or solid collodion, which have hitherto failed to accomplish the desired result or production of a superior article. In these experiments collodion has been employed in a partially-dissolved state, in which it is placed in the casts or molds containing the teeth, and subjected to pressure, from which plates thus formed the solvent material gradually evaporates. This evaporation is attended with such an amount of shrinkage as to warp the plates and impair their shape, which, in connection with the tedious nature of the process, has prevented the adoption of this and similar methods of using pyroxyline.

An attempt has also been made to avoid this shrinkage of the formed plates by subjecting the collodion in a nearly dried state to pressure in heated molds, and then attaching the teeth thereto by the use of powdered collodion and a solvent. This method has also failed of adoption, for the reason, among others, that the drying of the material by which the teeth are soldered in place has a tendency to leave the teeth loose, while the connection is rendered still less secure on account of the more porous nature of this soldering material, which is not subjected to pressure, as is the main body of the plates, the line of juncture also being frequently discernible from a difference in appearance.

Our invention consists of a dental plate or base for artificial teeth, composed of a kind of solid collodion, such as is described in Letters Patent of the United States granted to I. S. Hyatt and J. W. Hyatt, Jr., July 12, 1870, numbered 91,341, in which the transformation of the pyroxyline is effected by the use of camphor as a solvent, whereby the thoroughly-dried product or collodion is rendered plastic by heat, so as to be readily molded without subsequent shrinkage, as hereafter described, and without the use of fixed oils or fusible non-solvent gums which are required to be combined with the material when ether, alcohol, or other ordinary solvents are used, which fixed oils and gums, forming a part of the permanent compound, impair its qualities of strength, durability, purity, fineness of texture, &c., so essential in a dental plate.

In the manufacture of collodion for our dental plates, we prefer to use at least fifty parts, by weight, of gum-camphor to one hundred parts of soluble cotton, (a greater proportion of camphor may be used,) whereby the product is rendered more plastic than when a less quantity is employed.

The collodion thus produced is made into plates of suitable thickness, and are preferably formed into shapes approximating those of finished dental plates, by pressing in heated molds. The plates thus formed are now thoroughly dried by placing them in a drying-room heated to a temperature which should not exceed 180° Fahrenheit—150° to 180° being the temperature we have found best adapted for expelling the camphor solvent. A temperature much higher than 200° will expand the material and render it porous and brittle.

The plates, when properly dried, although freed from liability of shrinkage, still retain the quality which enables them to become plastic under a proper degree of heat and readily molded into any desired shape without subsequently shrinking to any injurious extent after being so remolded.

In making a set of teeth of our improved base, the case is prepared and teeth set in plaster by the same process and in the same manner as is done in making a set of hard rubber, except that the trial-plate should be made thinner. Care should be taken to use the best quality of plaster, and to thoroughly dry the casts before proceeding with the final process. Around the outside of the teeth next to the flask is cut a channel, connected by short channels or gates with the inside, to receive the excess of material. When the flasks are thus prepared, a plate of our base is placed in the lower flask, and the upper flask upon it, when the two flasks are put into a screw-clamp ready to be forced together. The flasks and clamp are then set into a small tank of oil, (good sweet oil works finely and emits no odor,) and a gas-jet or alcohol-lamp, placed under the oil-tank, is lighted and the oil heated to 300°, (never above 310° Fahrenheit,) which is determined by a thermometer attached to the vessel. As the oil heats, the plate becomes softened and plastic, when the clamp is gradually screwed down to place, scarcely any force being required until the last, when, the proper degree of heat being reached, the flasks are forced firmly and completely together. The clamp and flasks are then lifted out of the oil, and, if the flasks are seen to be entirely together on all sides, the work of molding is done. The flasks and contents are then immersed in cold water and thoroughly cooled, when, upon opening the flasks, the case will be seen to be molded in the most perfect manner, the teeth firmly attached, and the shape of the plaster-molds perfectly taken to the minutest particular. The case is then freed from plaster with brush and water, and finished and polished, as would be done with rubber. Chalk is used as a last finish, with cotton, wheel, and water.

Among the advantages of our new base are the following: First, it is lighter, and, at the same time, stronger than dental vulcanite or hard rubber; second, its color is very near that of the natural gum, and will not change in the mouth; third, it is entirely free from all unpleasant taste; fourth, it is not injurious to any mouth, even the most sensitive, which is not true of rubber plates containing a large amount of mercury, and is more pleasant and comfortable to the wearer than plates made of any other known material; fifth, it can be manufactured and fitted to the mouth easier, quicker, and more satisfactorily to the operator than can be done with any other known base for artificial teeth, saving time and trouble enough to the operator to pay for the plate, requiring only from one-third to one-quarter of the time used in working rubber; everything is neat, convenient, and clean, and no unpleasant odor fills the room or attaches to the hands of the dentist; sixth, after being thoroughly dried, it is easily rendered plastic by heat, so as to be readily molded, while it is free from all liability of shrinking, and consequent warping and derangement of shape, after it has been formed into a set of teeth, which is one of its most important advantages.

What we claim as our invention is—

The dental plate or base for artificial teeth, hereinbefore described, as a new article of manufacture.

ISAIAH S. HYATT.
  JOHN W. HYATT, Jr.
  JESSE A. PERKINS, M. D. S.

Witnesses:
  ALEX. McROBERTS,
  JAY HYATT.